United States Patent [19]

Forhan

[11] Patent Number: 5,355,061
[45] Date of Patent: Oct. 11, 1994

[54] WINDSHIELD WIPER SYSTEM

[75] Inventor: Michael Forhan, Urbana, Ohio

[73] Assignee: Grimes Aerospace Company, Columbus, Ohio

[21] Appl. No.: 825,628

[22] Filed: Jan. 24, 1992

[51] Int. Cl.$^5$ .............................................. B60S 1/08
[52] U.S. Cl. .................................... 318/443; 318/254; 318/259; 318/DIG. 2
[58] Field of Search .............. 318/443, 444, 281, 282, 318/283, DIG. 2, 138, 254, 439, 256, 257, 258, 259, 260, 261; 15/250 R, 250.12, 250.13, 250.16, 250.17

[56] References Cited

U.S. PATENT DOCUMENTS

| | | | |
|---|---|---|---|
| 3,721,878 | 3/1973 | Gumbert | 318/443 |
| 4,405,887 | 9/1983 | Tamura et al. | 318/443 |
| 4,614,903 | 9/1986 | Betsch et al. | 318/443 |
| 4,665,488 | 5/1987 | Graham et al. | 364/424 |
| 4,670,695 | 6/1987 | Licata et al. | 318/443 |
| 4,866,357 | 9/1989 | Miller et al. | 318/443 |

Primary Examiner—Bentsu Ro
Attorney, Agent, or Firm—Porter, Wright, Morris & Arthur

[57] ABSTRACT

The present invention is an improved windshield wiper assembly. The assembly includes a wiper blade which undergoes oscillatory rotary motion and is swept back and forth between two extreme locations across a windshield to remove rain and other precipitation from the windshield. A brushless DC motor has its output shaft connected to the wiper assembly. The foregoing results in rotary oscillation of the blade and permits the elimination of the four-bar mechanism which is typical of prior art wiper assemblies. The rotary motion of the blade in either direction is decelerated when the blade reaches a preselected position between two extreme locations.

20 Claims, 7 Drawing Sheets

TO FIG. 4B

WINDSHIELD WIPER SYSTEM

BACKGROUND OF THE INVENTION

The present invention relates to a windshield wiper system, and particularly to such a system for use on aircraft.

Wiper systems used on aircraft are generically similar to those used on automobiles, trucks and other ground vehicles. Wiper systems for both use environments have typically included a unidirectional electric motor. Oscillatory movement of wiper blades has typically been achieved by driving the blades through a mechanical four-bar or crank-rocker mechanism.

Aircraft wiper systems are typically larger, more robust and more expensive than those present on automobiles and trucks. Moreover, differences among various aircraft, primarily differences in the size and location of windshields, require suppliers of wiper systems to manufacture, and/or to maintain in inventory, a variety of systems and parts therefor, leading to further lack of economy. The heavy duty usage to which aircraft wiper systems are subjected results in their having relatively short operating lives, often only about 500 operating hours. This short useful life, magnifies the need to reduce the cost and/or increase the useful life of aircraft wiper systems.

Prior wiper systems are rather complex, and are often difficult to properly adjust or install on certain aircraft. The complexity of prior art mechanical wiper systems renders them inflexible. For example, altering wiping angle or blade speed with current four-bar-mechanisms utilizing aircraft wiper systems can prove difficult, if not impossible.

The provision of an efficient, reliable, low-cost, flexible and long-lived wiper system for aircraft is a primary object of the present invention.

SUMMARY

With the above and other objects in view, the present invention contemplates an improved windshield wiper assembly. The assembly includes a wiper blade which undergoes oscillatory rotary motion and is swept back and forth between two extreme locations across a windshield to remove rain and other precipitation from the windshield.

A brushless DC motor has its output shaft connected to the wiper assembly. Rotation of the output shaft in a first or second direction rotates the blade in the first or second direction between the extreme locations.

Facilities periodically change the direction of rotation of the motor and of its output shaft when the blade reaches the extreme locations. The foregoing results in rotary oscillation of the blade and permits the elimination of the four-bar mechanism which is typical of prior art wiper assemblies.

Facilities also respond to the blade reaching the extreme locations and an intermediate location to perform three functions. First, the rotary motion of the blade is accelerated in the first direction immediately after the motion changes from the second to the first direction at one of the extreme locations. Second, a similar acceleration in the second direction occurs when the motion changes from the first to the second direction. Third, the rotary motion of the blade in either direction is decelerated when the blade reaches a preselected position between the extreme locations.

In typical usage, a wiper system comprises two of the foregoing assemblies in a side-by-side relationship to wipe adjacent windshields. In this latter event, there may be facilities which synchronize the rotary position of each wiper of the system. These facilities may include devices for generating signals representative of the speed and/or position of both wipers and a comparator for each wiper assembly which receives the signals, compares the signals and adjusts the speed of its wiper accordingly.

In one embodiment the motor drives the wiper through reduction gearing. In this way the wiper moves between its extreme locations as the motor rotates a multiplicity of times.

DETAILED DESCRIPTION

Figure 1:
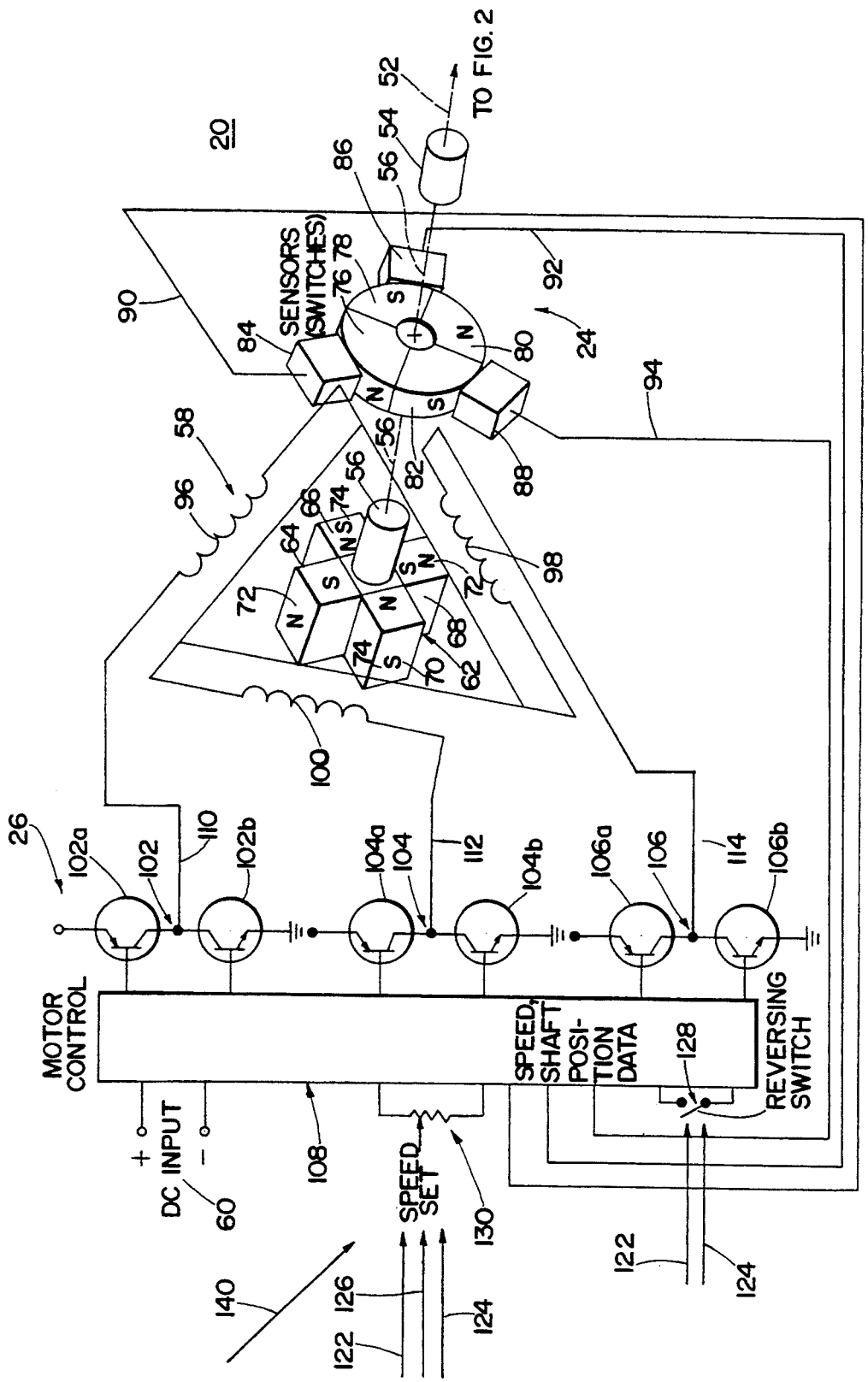
FIG. 1 is a schematic diagram of a brushless DC motor and of controls therefor for operation of a windshield wiper assembly according to the present invention.
Figure 2:
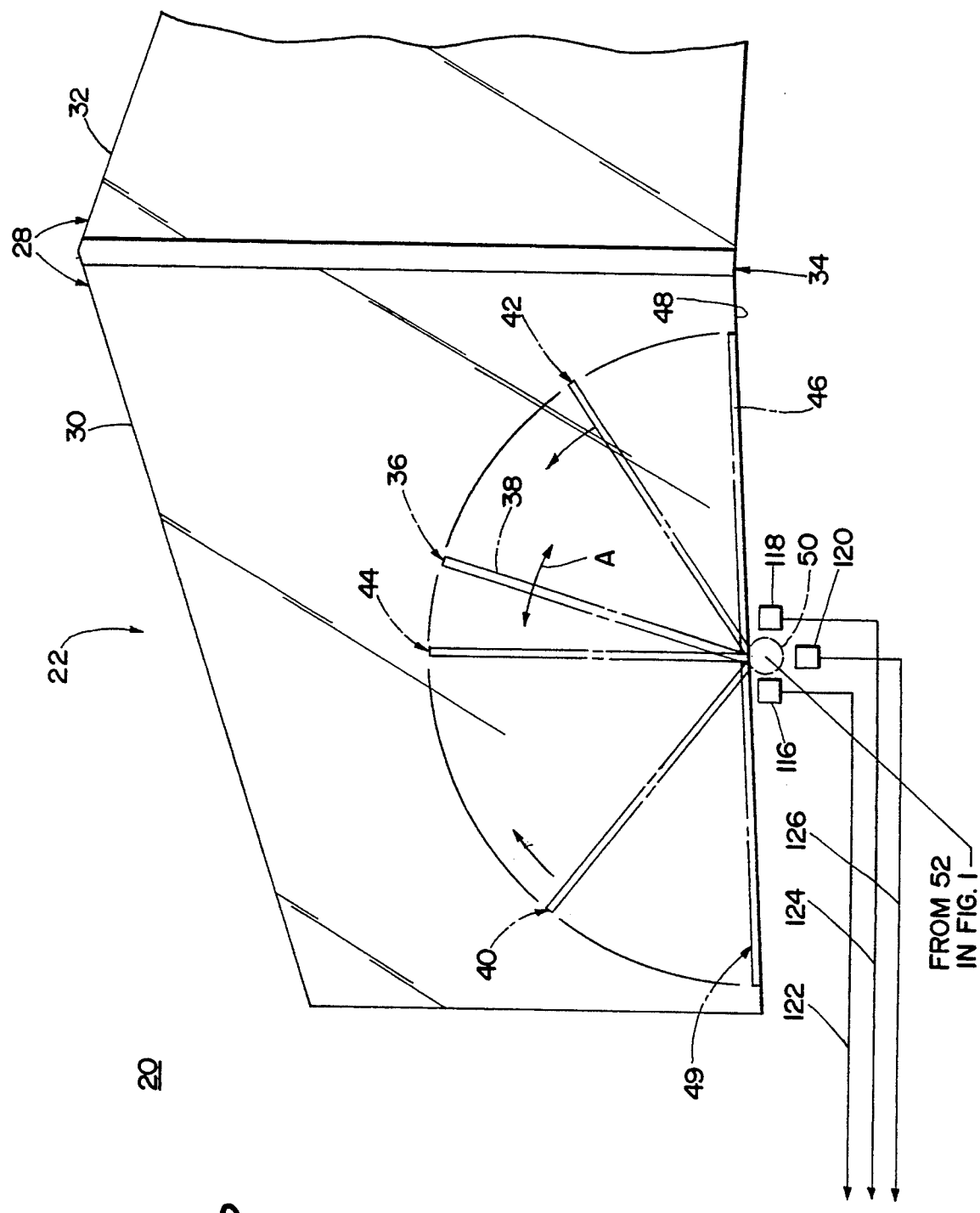
FIG. 2 is a diagrammatic presentation of a windshield assembly wiper operated by the facilities of FIG. 1.

Referring to FIGS. 1 and 2, an aircraft windshield wiper system 20 may be seen to include a windshield wiper subsystem 22 (FIG. 2), a wiper-operating motor subsystem 24 and a control subsystem 26 for the motor subsystem.

The wiper subsystem 22 includes a windshield 28 having a left portion 30 and a right portion 32. The portions 30 and 32 may comprise separate areas of a single sheet of glass or may, as depicted, constitute separate sheets of glass which abut or are adjacent along or near a center line or post 34. The windshield 28 is located at the front of a flight deck or cockpit of an aircraft. Use of the wiper system 20 with such an aircraft constitutes the preferred use environment for the present invention.

The wiper subsystem 22 includes a rotatable wiper assembly, shown only generally at 36, for the left windshield portion 30. The wiper assembly 36 may include an arm (not visible) to which is mounted or attached a squeegee-like blade 38, the reference numeral 38 hereafter designating the blade and its associated arm. The arm is rotatably oscillated to sweep the blade 38 back and forth (double-headed arrow A) between extreme locations 40 (left or outboard) and 42 (right or inboard) across the windshield portion 30. Such movement of the blade/arm 38 periodically removes water and other precipitation from the windshield portion 30 to provide a clear view through the windshield 28. Between the extreme locations 40 and 42 is a generally central location 44, defined as such for a purpose to be described below. The location 44 is preferably about midway between the locations 40 and 42.

When the wiper subsystem 22 is not in use, the blade/arm 38 may be "parked" at an inboard location 46 which is past or below the location 42 and may be at, near or below the lower edge 48 of the windshield portion 30. The blade 38 may be similarly "parked" at an outboard location 49 which is past or below the outboard location 40. If desired, the blade 38 may also be "parked" on the windshield portion 30 at or near one of the locations 40 or 42.

The rotational oscillation of the blade/arm 38 is effected by selective oscillatory rotation of a driven shaft generally shown at 50 in FIG. 2. The driven shaft 50 has, in the past, been connected to a four-bar reversing linkage operated by a unidirectional electric motor. In the present invention the driven shaft 50 is connected to or integral with an output shaft 52 of a reduction gear assembly 54 (shown generally in FIG. 1), which is in turn driven by the output shaft 56 of a brushless DC motor 58 in the subsystem 24 of FIG. 1. Associated with the right-hand windshield portion 32 are preferably elements similar to those described above with respect to the left-hand portion 30.

The motor 58 is preferably a brushless DC motor which is selectively energizeable from a DC source 60. Numerous brushless motors having various configurations are suitable for use in the present invention, and include brushless motors made by Eastern Air Devices, Inc. of Dover, N.H. As seen in FIG. 1, in the exemplary embodiment hereof, the generalized motor 58 includes a rotor 62 having four permanent magnets 64, 66, 68 and 70 oriented so that a pair of diametric north poles ("N") 72 of the magnets 64 and 68 are normal to the diameter on which lie a pair of south poles ("S") 74 of the magnets 66 and 70. The rotor 62 is supported by and rotates the output shaft 56. The number of magnets 64–70 may vary and the techniques for appropriately presenting north and south poles—in FIG. 1, for example, adjacent north and south poles could be opposite poles of a single permanent magnet, according to the type of brushless motor construction which is desired.

Also mounted on the shaft 56 are four permanent magnets 76, 78, 80 and 82 each of which are respectively rotationally aligned, and correspond pole-wise, with one of the magnets 64–70. Sensors 84, 86 and 88 are located 120° apart about the shaft 56. These sensors 84, 86 and 88 preferably comprise Hall-effect switches, each having an output 90, 92 and 94 on which a signal of a selected polarity appears whenever a magnetic pole of a magnet 76, 78, 80 and 82 moves therepast.

Surrounding the rotor 62 are stator windings 96, 98 and 100. When a current of a predetermined polarity flows through the windings 96, 98, 100, the poles 72,74 of the magnets 64–70 are attracted thereto, thereby effecting rotation of the rotor 62 in one direction. As is known, if the time relationship of current flow through the stator windings 96–100 is properly controlled, the rotor 62 will smoothly rotate. Increasing the time during which current flows through the windings 96–100 (i.e., increasing the width of the pulse of current through the windings 96–100) increases the rotational speed of the rotor 62. Decreasing this time (i.e., decreasing the current pulse width) decreases the rotational speed of the rotor 62. Thus, the speed of the motor 58 is controllable by a type of pulse width modulation. Appropriate energization of the windings 96–100 can also stop or dynamically brake the rotor 62 and/or cause it to rotate in a reverse direction. Braking of the rotor 62 can also be achieved by shorting the windings 96–100.

Figure 4A:
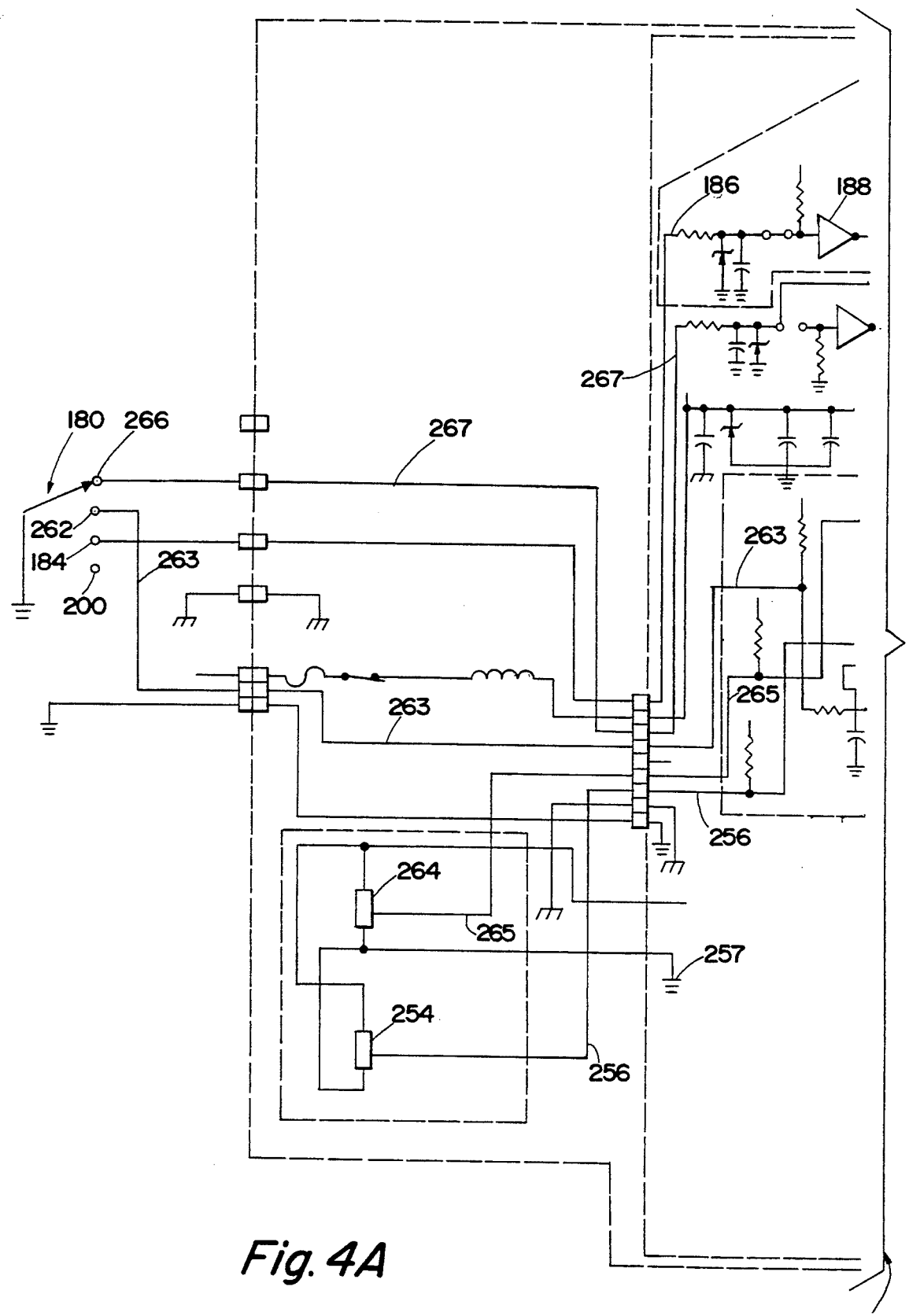
FIG. 4 is a detailed schematic diagram of one embodiment of the controls for the brushless DC motor of FIG. 1.
Figure 4B:
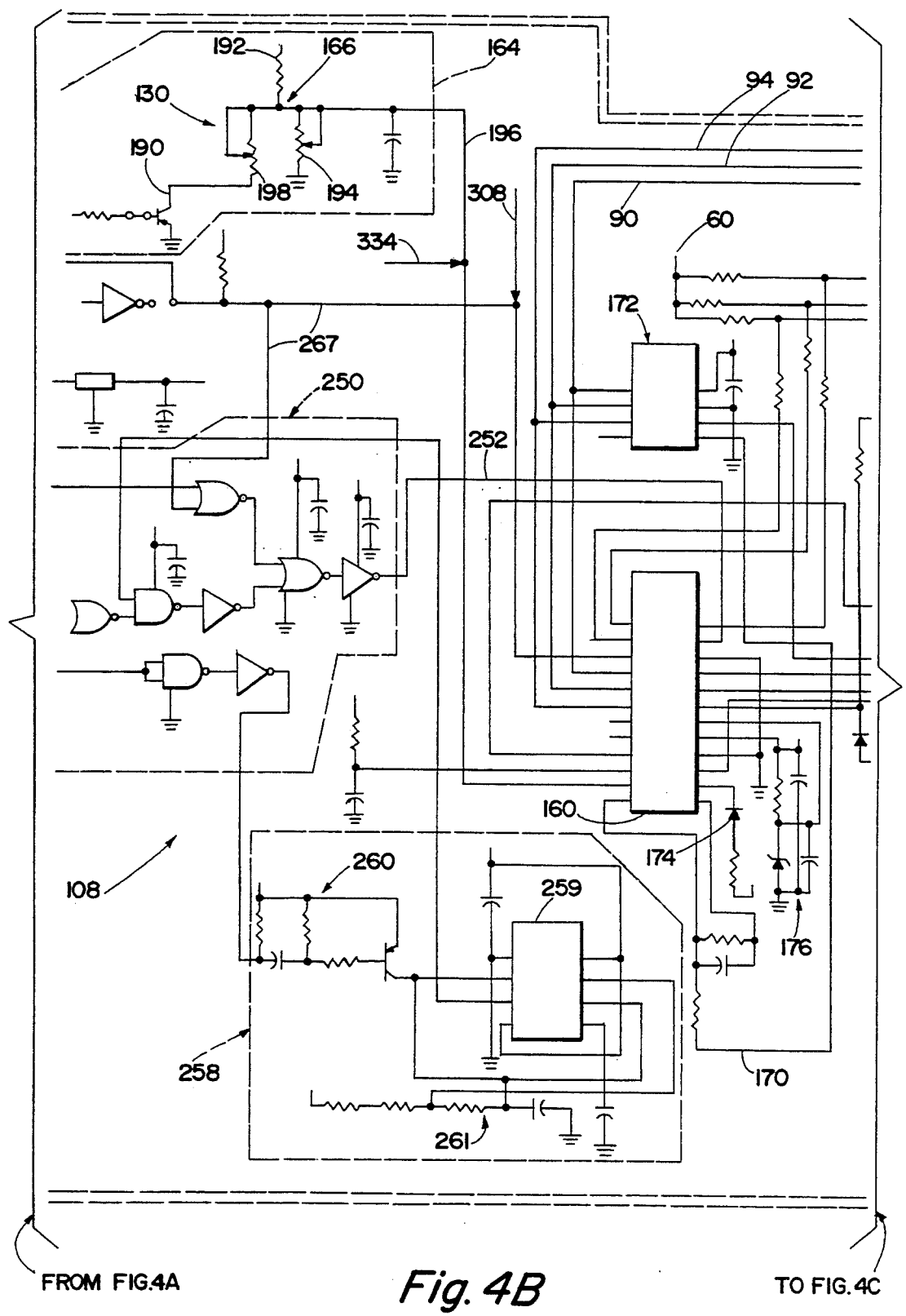
Figure 4C:
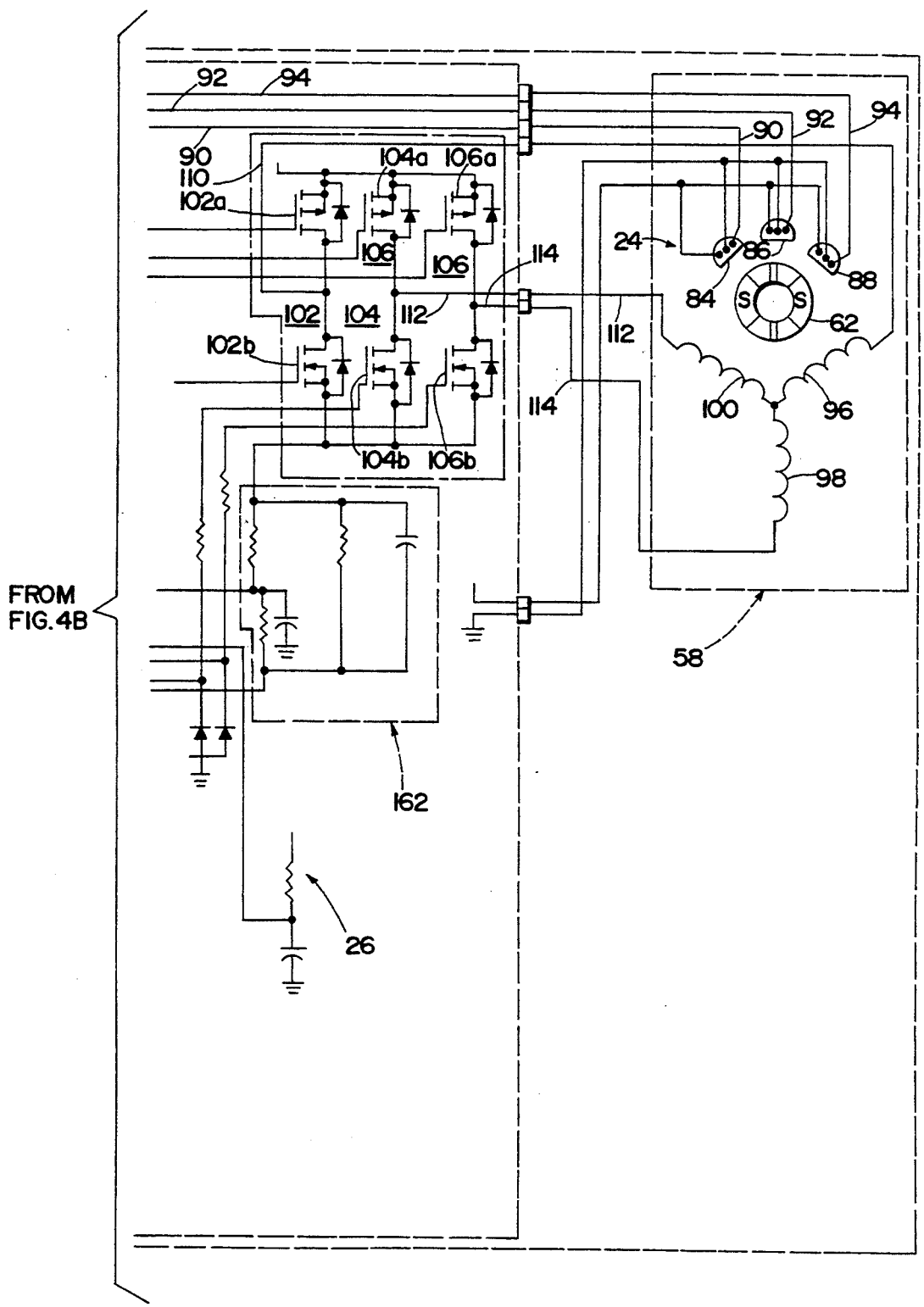

The energization of the windings 96–100, and, hence, the speed and direction of rotation of the rotor 62, is controlled by switches 102, 104 and 106 in the control subsystem 26. Each of the switches 102–106 may comprise a pair of transistors 102a/102b, 104a/104b, 106a/106b connected in a "totem pole" configuration. Although bipolar transistors 102a, 102b, etc. are shown in FIG. 1, other equivalent circuit components such as FET's or other devices may be used, as seen in FIG. 4. The switches 102, 104, 106 are selectively operated so that outputs 110, 112 and 114 of each pair 102a/102b, etc., selectively carry a DC voltage, are grounded, or are not connected to the DC voltage or to ground. This operation of the switches 102–106 energizes and de-energizes the windings 96–100 in response to the signals on the outputs 90–94.

The signals on the outputs 90–94 of the sensors 84–88 are processed by logic circuitry 108 in the control subsystem 26 so as to effect rotation of the rotor 62 generally as set forth hereafter. Each switch 102–106 comprises a pair of transistors 102a/102b, etc., the emitter of each transistor 102b, 104b, 106b being grounded. When the transistor 102a, 104a, 106a of the affected switch 102, 104, 106 is "on" and the transistor 102b, 104b, 106b is "off", current flows away from the switch 102, 104, 106 along the output 110, 112 or 114. When the transistor 102a, etc. of a switch 102 etc. is "off" and the transistor 102b, etc. is "on" current can flow toward the switch on its output 108–112 and thence to ground. When both transistors 102a/102b, etc. are "off" the output is "open" that is it carries neither current nor ground potential. The logic circuitry 108 is designed to turn "on " the transistor 102a, etc. of one switch 102–106 at the same time it turns "on" the transistor 104b, etc. of another switch 102–106.

Thus, when the transistor 102a of the switch 102 is "on" and the transistor 104b of the switch 104 is "on", current flows from the input 60 through the windings 96 and 100. Similarly, turning "on" the transistor 104a of the switch 104 will result in energizing the windings 100 and 96 or the windings 100 and 98, depending on whether the transistor 102b or 106b is "on". Selectively turning "on" and "off" the transistors of the switches 102–106 effects rotation of the rotor 62 at selected speeds and in a selected direction.

As noted above, it is desirable to eliminate the four-bar mechanism of prior art wiper systems. This goal can be achieved by the use of sensors, generally depicted at 116 and 118 (FIG. 2), located so as to sense the position of the driven shaft 50, of the output shaft 52 or of the blade/arm 38. Because the reduction gear assembly 54 (FIG. 1) preferably causes the blade 38 to traverse the windshield portion 30 between the extreme positions 40 and 42 (FIG. 2), the shafts 50 and 52 preferably rotate less than one turn, while the output shaft 56 of the motor 58 rotates many more times, typically as much as 45–50 times. Thus, the sensors 116, 118 are preferred to be associated with the shafts 50 or 52—the rotational position of which is a direct analog for the position of the blade 38—rather than adjacent the more rapidly rotating shaft 56 of the motor 58.

The sensors 116 and 118 may be similar to the Hall-effect sensors 84–88. To that end, a magnet assembly (not shown) similar to the assembly 76–82 may be appropriately associated with the shafts 50, 52. The sensors 116, 118 may also be optical devices, as may the sensors 84–88. Another sensor 120, similar to the sensors 116, 118 is also associated with the shafts 50, 52 for a purpose described below.

The sensor 116 provides a signal on its output 122 when the blade 38 is in the extreme location 40. The sensor 118 provides a signal on its output 124 when the blade 38 is in the extreme location 42. The sensor 120 provides a signal on its output 126 when the blade 38 is at or near the central location 44 between the locations 40 and 42. The outputs 122-126 and their representation in FIGS. 1 and 2 should be understood to be schematic and to generally represent actual mechanical and electrical relationships.

In preferred embodiments, when the system 20 is activated, the direction of rotation of the motor 58 reverses at each extreme location 40, 42 of the blade 38 as sensed by the sensors 116, 118. This reversal is represented in symbolic terms by the conjunction in FIG. 1 of the outputs 122 and 124 with a motor-rotation reversing facility 128, generally depicted as a simple reversing switch.

It is also preferred that upon the blade 38 reaching one of the extreme locations 40 or 42 and immediately reversing direction, it is accelerated until it reaches the central location 44, following which it is decelerated until it reaches the other extreme location 42 or 40. Following this, the process is duplicated as the blade 38 oppositely rotates. The foregoing effects rapid wiping while minimizing shock to the mechanical parts of the system 20 by decreasing rotational speed just before and as the blade 38 is stopped and reversed. This mode of operation is pictorially symbolized by the presence of the three outputs 122-126 near a schematically depicted speed set control 130 associated with the control subassembly 26 in FIG. 1.

The sensors 116-120 may be located at a wide variety of sites relative to the windshield portion 30. Thus, the sweep angle of the blade/arm 38 may be selected and-/or adjusted to meet specific use or environmental needs or to be compatible with a particular aircraft. Moreover, simple electrical switches in the flight deck connected to the sensors 116-120 and to other variantly positioned sensors may be operated to render effective preferred sensors (and render ineffective non-preferred sensors) for achieving varying wiping characteristics.

The signals on the outputs 90-94 of the sensors 84-88 and on the outputs 122-126 of the sensors 116-120 may be viewed as indicating the rotational speed of the blade 38. Using the signals on the outputs 90-94 may be preferred because the shaft 56 rotates a greater number of times than do the shafts 50 and 52. Thus, the signals on the outputs 90-94 occur a great number of times per movement of the blade 38 between the extreme locations 40 and 42, and accordingly, give a more accurate, real time, analog indication of the speed of the blade 38. However, using the signals on the outputs 122-126 may be preferred, since they provide a direct indication of the speed of the blade 38, not a surrogate thereof. Other sensors (not shown) may also be utilized to measure the speed of the blade 38.

In some embodiments, the blade 38 and the adjacent blade (not shown) rotate in synchronism. The blades 38 may rotate in the same direction at the same time, or they may together rotate first toward and then away from the centerline 34. In either event, when the blades 38 preferably rotate at the same speed, they are also positionally synchronized.

Figure 3:
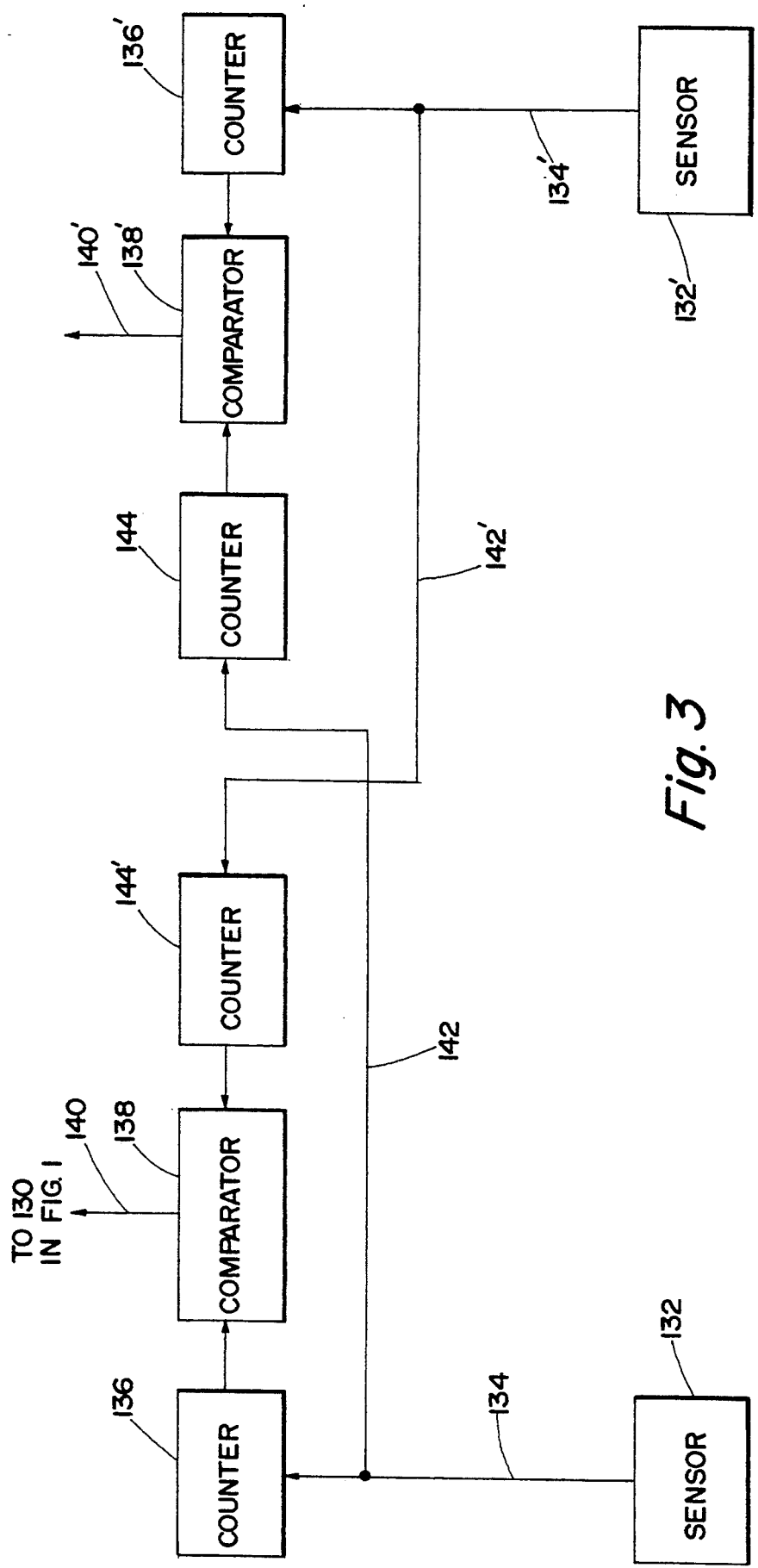
FIG. 3 is a diagrammatic representation of a synchronizing facility for use when two of the assemblies of FIGS. 1 and 2 are used side-by-side.

As shown schematically in FIGS. 1 and 3, in preferred embodiments signals from an appropriate sensor 132 indicate the absolute position of the blade 38 on an output 134. As the blade 38 moves, the sensor 132 produces plural signals, for example, as a plurality of magnetic sites on the shaft 50 or 52 moves therepast. A sensor 132' produces similar signals indicative of the position of the right-hand blade (not shown) on its output 134'. The signals on the output 134 are sent to a counter 136 and, via a path 142 to a counter 144. The signals on the output 134' are sent to a counter 136' and, via a path 142', to a counter 144'. Each value on the counters 136 and 136' represents a defined position of its related blade. A comparator 138 compares the counts of the counters 136 and 144' and via an output 140 affects the speed set 130 to increase the speed of the motor 58, to decrease the speed of the motor 58 or to not alter the speed of the motor 58. A comparator 138' produces signals on an output 140' which adjust a speed set (not shown) similar to the speed set 130 in FIG. 1 for increasing, decreasing or not changing the speed of the motor (not shown) for the right-hand blade.

FIG. 4 illustrates a specific embodiment of the logic circuit 108.

Referring to FIG. 4, the primary motor controller in the logic circuitry 108 is a silicon monolithic IC 160, such as a Motorola MC33035, a Unitrode UC1625 motor control IC, or other appropriate IC.

Pins 1, 2 and 24 of the IC 160 provide drive power to the upper transistors 102a, 104a and 106a of the switches 102, 104 and 106 while Pins 19, 20 and 21 drive power the lower transistors 102b, 104b, 106b of the switches 102, 104 and 106. Pin 3 controls the manner in which Pins 1, 2, 19, 20, 21 and 24 energize the windings 96, 98, 100 and hence determines the direction, clockwise (CW) or counterclockwise (CCW), in which the rotor 62 rotates. A logical "0" applied to Pin 3 effects CW rotation; a logical "1" causes CCW rotation.

Pins 4, 5 and 6 of the IC 160 receive signals, from the sensors 84, 86, 88 to determine the position of the rotor 62. These signals are used by the IC 160 to effect appropriate commutation of the motor 58. Depending on the position of the rotor 62 as sensed by the sensors 84, 86, 88 the switches 102, 104 and 106 are energized to selectively apply power to the windings 96, 98, 100 from the DC source 60 as described earlier. Although not used in the present embodiment, Pin 7 of the IC 160 is an "output enable." A logical "1" applied to Pin 7 permits the motor 58 to run; a logical "0" permits the motor 58 to coast. Unused Pin 8 carries a reference voltage supply.

Pins 9 and 15 are current-sensing inputs of the IC 160 Pin 9 is non-inverting and Pin 15 is inverting. These Pins 9 and 15 are connected to a voltage divider network 162. Current flowing through the lower transistors of the switches 102, 104, 106 after flowing through the windings 96, 98, 100 of the motor 58 from the upper transistors of the switches 102, 104, 106 also flows to ground through the network 162. If the voltage on the Pin 9 with respect to the Pin 15 exceeds a predetermined maximum, the conduction of the switches 102, 104, 106 is terminated to limit current flow through the motor 58 to a selected level.

When energized by Vcc, Pin 10 energizes an oscillator which is internal to the IC 160. The frequency of the oscillator sets the pulse width modulation frequency of the signals on the pins 1, 2, 24 and 19, 20, 21 to control the speed and direction of the motor 24 by controlling the "on"/"off" condition of the switches 102-106.

Pin 11 is a non-inverting input to an error amplifier internal to the IC 160. The speed of the motor 58 is proportional to the voltage applied to Pin 11. This voltage is derived from a speed control network 164 which includes a voltage divider 166. The network 164 and the divider 166 operate to apply a proportional voltage to Pin 11 to thereby effect slower or faster rotation of the motor 58. Pin 12 is the inverting input of the error amp for which Pins 11 and 12 are inputs. Signals on Pin 13 are applied to Pin 12 via a network 170; signals from a tachometer IC 172 are also applied to Pin 12 via the network 170.

Pin 14 normally carries a logical "1". A logical "0" is present when there is present on Pin 4, 5 or 6 an invalid input code for the sensors 84, 86, 88 (e.g.; caused by improper wiring or failure of the sensors 84–88) when a current limiting condition is present (e.g., when pins 9 and 15 detect excess current flow), when there is under-voltage lock out due to input power being too low, or when thermal shutdown occurs due to the IC 160 becoming overheated. A logical "0" on Pin 14 permits Vcc to illuminate a light emitting diode 174 for giving a visual indication of an untoward event.

Pin 16 of the IC 160 is a ground for +Vcc supply on Pin 17 and +Vc supply on Pin 18, these supplies being derived from a power supply 176. Vcc on pin 17 is used to internally power the IC 160. Vc is used to furnish power to the lower transistors 102b, 104b and 106b of the switches 102, 104, 106. This is achieved internally in the IC 160 by applying Vc to Pins 19, 20 and 21. Pin 22 selects either 60° phasing or 120° phasing for the motor 58. A logical "1" on Pin 22 selects the former and a logical "0" selects the latter. The connection of Pin 22 to Pin 16 as depicted in FIG. 4 applies a "0" to Pin 22. Pin 23 serves as a brake signal input for the motor 58. A logical "0" on Pin 23 permits the motor 58 to run; a logical "1" effects dynamic braking of the motor 58.

The IC 160 may use pulse width modulation to increase and decrease the speed of the motor 58 and to regulate the speed of the motor 58 under varying loads imposed on the blade 38 by varying conditions such as the amount of rain or snow, icing, air speed, etc. Speed control requires a tachometer signal which is supplied by the tachometer IC 172.

The tachometer IC 172 may be an IC such as a Motorola MC33039. Pins 1, 2 and 3 of the IC 172 respectively receive signals from the sensors 84, 86 and 88 on the outputs 90, 92, 94, the same outputs as are connected to Pins 4, 5 and 6 of the IC 160. As described above, the signals on the outputs 90, 92 and 94 represent the position of the rotor 62. At each positive and negative transition produced by the sensors 84, 86, and 88 there is present on Pin 5 of IC 172 a pulse. Pulses from Pin 5 are fed to the network 170 which produces a proportional voltage signal between Pins 12 and 13 of the IC 160. This voltage signal is proportional to the speed of the motor 58. After the speed-dependent voltage is applied to Pins 12 and 13 of the IC 172, it is compared with the voltage produced by the voltage divider 166 of the speed control network 164 and applied to Pin 11 of the IC 160. The voltages on Pins 11 and 12 of the IC 160 are compared by its internal error amp. If the voltage on Pin 12 is lower than that on Pin 11, the motor 58 is operating too slowly, and Pins 1, 2, 24 and 19, 20, 21 are energized to operate the switches 102, 104 and 106 and to energize the windings 96, 98, 100 so as to increase the rotational speed of the rotor 62. In effect the duty cycle of the inputs to the switches 102, 104, 106 is increased until the voltages on Pins 11 and 12 are equal. Slowing down the rotor 62 when the motor 58 operates too fast similarly involves decreasing the duty cycle of the inputs to the switches 102, 104, 106.

The motor 58 may have various selectable speed range settings, a "low" and a "high" setting being selectable in FIG. 4. Speed range is selectable by a switch 180 located in the flight deck. When "low" is selected, a switch arm 182 is moved to apply ground to a contact 184 and from there to an input 186 of the speed control network 164. This ground causes an inverter 188 to turn "on" a normally "off" transistor 190. The voltage divider 166 normally includes resistors 192 and 194 connected between Vcc and ground. An output 196 taken between the resistors 192 and 194 is connected to Pin 11 of the IC 160. With the transistor 190 "on", a resistor 198, which is normally not electrically included in the voltage divider 166, is paralleled with the resistor 194. The resulting relatively low voltage on the output 196 is applied to Pin 11 of the IC 160 and is compared by the IC 160 to the voltage on its Pin 12 which is proportional to the actual speed of the motor 58 due to the operation of the IC 172.

A "high" setting is achieved by moving the arm 182 to a contact 200 in the switch 180. The contact 200 is inactive and is not connected to the network 164. Thus, this action causes the inverter 188 to permit the transistor 190 to be "off", effectively removing the resistor 198 from the voltage divider 166 (192, 194). The voltage on the output 196 is, thus, relatively high, and its application to Pin 11 of the IC 160 ultimately results in the motor operating at higher speed.

The signals on the outputs 140 (and 140') of FIG. 3, may be similarly used to affect the elements constituting the speed set 130. For example, the signals on the output 140 may be applied to the speed control network 164 or its voltage divider 166, or to Pin 11 of the IC 160. In this way, when the left blade 38 is out of sync with the right blade, the IC 160 will increase or decrease its speed depending on whether it is slower or faster than the right blade.

The motor 58 may be operated so as to operate the blade 38 in various "park" modes and in a "delay" mode.

When the blade 38 is operated in a delay mode, it is moved from one extreme position 40 or 42 to the other extreme position 42 or 40 and then back to the initial position 40 or 42. The blade 38 then remains at the initial extreme position 42 or 40 until a selected delay or dwell time has passed. Following the delay time, the blade 38 is again moved by the motor 58 through one sweep cycle (40 to 42 to 40, or 42 to 40 to 42) and thereafter delayed at its initial extreme position 40 or 42.

In one park mode, when the system 120 is turned off, the blade 38 comes to rest "on glass" that is some where on the portion 30 of the windshield 28. The "on glass" rest position of the blade 38 may (or may not) correspond to one of the extreme locations 40 and 42. The blade 30 may also come to rest "off glass" or "off sweep", that is, below the lower edge of the portion 30 of the windshield 28 and either directly on the fuselage of the aircraft or on a lift block thereon, as is well known.

Both the delay mode and the park mode are effected through the use of decoder logic 250. An output 252 of the decoder logic 250 carries either a "0" or a "1" and is connected to Pin 23 of the IC 160. The motor 58 may run when a "0" is present and is dynamically braked when a "1" is present.

The delay mode utilizies a sensor 254 which may be similar to the sensors 116, 118 and 120. The sensor 254 is located at or near one of the positions 42 or 40 whereat the blade 38 stops for the length of the time delay before being moved through a wipe cycle. The sensor 254 produces a logical "0" or "active low" on its output 256 when the blade 38 is adjacent thereto.

When the blade 38 is not adjacent to the Sensor 254, the output 256 carries a logical "1." A logical "1" may constitute Vcc, while a logical "0" may constitute a ground 257. The decoder logic 250 includes a number of logic gates which may be as shown in FIG. 4 or which may assume any other convenient configuration. While the blade 38 is moving, the sensor 254 applies a logical "1" to its output 256 and to the logic gates of the decoder logic 250.

A delay timer 258 comprises an IC 259, such as an astable timer (e.g., Motorola M7555), a reset circuit 260 and a delay control circuit 261. Pin 3 of the IC259 normally carries a logical "1" during a pause cycle. A pause cycle is initiated by the switch arm 182 engaging a contact 262 of the switch 180 to apply ground or logical "0" to the inputs of selected logic gates of the decoder logic 250 via a conductor 263. The presence of the logical "0" on the conductor 263 effects the application of a logical "0" to Pin 23 of the IC 160 permitting the blade 38 to move. The pause cycle begins when the blade 38 moves into adjacency with the sensor 254. This produces a logical "0" on the output 256, which, via the decoder logic 250, applies a logical "1" to pin 23 of the IC 160, thereby braking the wiper 38. After a delay determined by the delay control circuit 261 Pin 3 of the IC 259 momentarily carries a logical "0" which affects the logic gates of the decoder logic 250 to apply a logical "0" to Pin 23 of the IC 160 permitting the blade 38 to again move.

In preferred embodiments, once the blade 38 begins to move, after a time determined by the delay circuit 261, Pin 3 of IC 259 returns to a logical "1." The blade 38 continues to move, however, due to the presence of a logical "1" on the output 256. The blade 38 moves to, and is held in, the park position 46 or 49 by the operation of a sensor 264, connected to the decoder logic 250 by an output 265, in conjunction with the engagement of the switch arm 182 with a contact 266 to apply ground to the logic gates of the decoder logic 250 and to Pin 3 of the IC 160 via a conductor 267.

Figure 5:
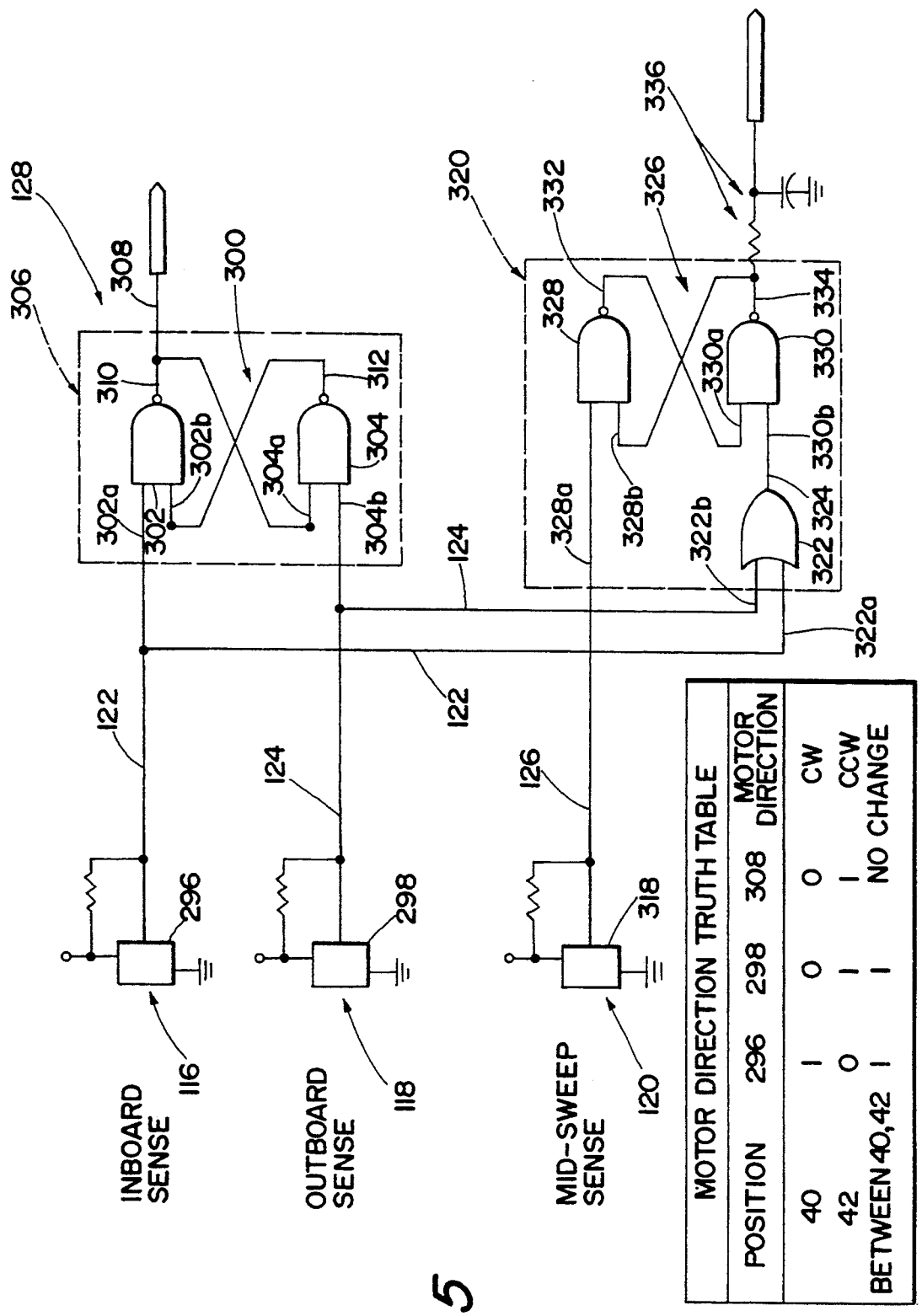
FIG. 5 is a detailed schematic diagram of one embodiment of facilities for selectively accelerating and decelerating the windshield wiper assembly of FIGS. 1 and 2.

Referring now to FIG. 5, there are shown specific embodiments of the schematically depicted reversing switch 128 and the manner in which the outputs 122–126 affect the speed set control schematically depicted at 130 in FIG. 1 to achieve the controlled accelerated/deceleration of the blade 38 as it sweeps across the left portion 30 of the windshield 28.

As described earlier, the blade 38 sweeps between extreme locations 40 and 42. The extreme 40 is outboard and the extreme 42 is inboard. For the left windshield portion 30, the sensors 116 and 118 may be located as symbolicly depicted in FIG. 1 or they may be located near the extreme location 40 and 42 of the blade 38. Further the sensors 116 and 118 may be magnetic, optical or other sensors, Hall-Effect sensors 296, 298 being shown in FIG. 5.

The reversing switch 128 may take the specific form 300 shown in FIG. 5 which comprises logical NAND gates 302 and 304 of any desired construction connected as a set/reset (SR) latch 306, an output 308 of which is connected to Pin 3 of the motor control IC 160. As noted earlier, a logical "0" applied to Pin 3 of the IC 160 effects clockwise (CW) rotation (inboard-to-outboard) of the motor 58 and a logical "1" on Pin 3 effects counterclockwise (CCW) rotation (outboard-to-inboard) of the motor 58. Preferably the sensors 296, 298 are of the type which normally apply a logical "1" to their outputs 122 and 124 and which momentarily apply a logical "0" to the outputs 122 or 124 when the blade 38 reaches or is located at an extreme location 40 or 42.

Assuming that the blade 38 is rotating CCW, a "1" is present on Pin 3 of the motor control IC 160. Accordingly, a "1" appears on the output 308, on an output 310 of the NAND gate 302 and on one input 304a of the NAND gate 304. One input 302a of the NAND gate 302 has a "1" thereon by virtue of the "1" on the output 122 of the outboard sensor 296. The input 304b of the NAND gate 304 also has a "1" thereon because the output 124 of the inboard sensor 298 carries a "1". Because the inputs 304a, 304b are "1" and "1", an output 312 of the NAND gate 304 and the input 302b of the NAND gate 302 are "0".

When the blade 38 reaches the outboard location 40, the sensor 298 momentarily produces a "0" on its output 124. The resulting "1" on the output 312 and the input 302b of the gate 302, produces a "0" on the output 308 and pin 3 of the IC 160. The "0" on pin 3 reverses the motor 58 to rotate the blade 38 clockwise to the inboard location 42, whereat the motor 58 and blade 38 again reverse direction.

Continuing to refer to FIG. 5, there is shown a specific embodiment of circuitry 320 to achieve the accelerated/decelerated operation described earlier and represented by the outputs 124–126 and the speed set control 130 shown in FIG. 1.

The circuitry 320 is connected to the sensors 296 and 298 and to a sensor 318 generally shown in FIG. 2 as sensor 120.

The sensor 318 may be similar in construction and function to the sensors 296 and 298. The sensor 318 detects the midpoint of the travel of the blade 38 by sensing the position thereof or the position of the shaft 50. When the blade 38 passes the midpoint 44 of its sweep, the sensor 318 momentarily produces a "0" instead of normal "1" on the output 126. The circuitry 320 may include a two-input OR gate 322 with each of its inputs 322a, 322b respectively connected to one of the outputs 122, 124 of the sensors 296, 298. The output 324 of the gate 322 will momentarily carry a "0" whenever the blade 38 reaches one of the extreme locations 40 and 42.

The circuitry 320 includes a set-reset (SR) latch 326 which may include two NAND gates 328 and 330. The output 324 of the gate 322 is connected to a "set" input 330b of the gate 330. The output 126 of the sensor 318 is connected to a "reset" input 328a of the gate 328. An output 332 of the gate 328 is connected to an input 330a of the gate 330. An output 334 of the gate 330 is connected to an input 328b of the gate 328.

The output 334 is connected to Pin 11 of the IC 160 via an R-C network 336. When a logical "1" is present on the output 334, the R-C network 336 is inserted into the voltage-divider speed control network 164 associated with Pin 11 of the IC 160. Since the rotational velocity of the motor 58 is constantly adjusted by the IC 160 to be proportional to the voltage on Pin 11, a logical "1" on the output 334 increases the speed of the motor 58. The capacitor of the network 336 effects a gradual build-up of the speed increase until a maximum is reached to minimize mechanical shock to the wiper assembly 36. When a logical "0" is on the output 334, the network 336 causes a deceleration of the motor 58, and the speed of the motor 58 is thereafter determined by, the speed control network 164.

Other electrical facilities may be used to effect directional changes and speed modulation, as should be obvious.

The operation of the circuitry 320 is summarized as follows. When none of the sensors 296, 298 and 318 produce a logical "0", the blade 38 is between adjacent sensors 296/318 or 298/318. Assuming the blade 38 is between the sensors 296 and 318 and is rotating CW, a logical "1" is present on the output 334 which moves the blade 38 at a relatively higher speed. A logical "1" is on the output 126 of the sensor 318 and on the connected input 328a of the gate 328. Both inputs 322a and 322b of the gate 322 being "1", the output 324 and the input 330b of the gate 330 are "1" The input 328b of the gate 328 is "1", and the output 332 of the gate 328 and the connected input 330a of the gate 330 are "0".

When the sensor 318 detects that the blade 38 is at the midpoint 44 of its CW travel, a "0" momentarily appears on the output 126 and on the connected input 328a of the gate 328. This "0" ultimately resets the SR latch 326 producing a "0" on the output 334, placing the motor 58 under the control of the speed control network 164. When the blade 38 reaches the location 42, and the sensor 298 effects CCW movement, the sensor 298 also sets the SR latch 326 so that a logical "1" on the output 334 thereafter accelerates the blade 38 in the CCW direction, until the sensor 318 again detects the blade 38 at the midpoint 44. This resets the latch 326 until the blade 38 reaches the location 40.

The above are exemplars of a preferred embodiment of the present invention. Those skilled in the art will appreciate that numerous changes and additions can be made without departing from the spirit and scope hereof as set forth in the appended claims.

What is claimed is:

1. An improved windshield wiper assembly of the type in which a wiper blade undergoes oscillatory rotary motion and is swept back and forth between two extreme locations across a windshield to remove rain and water therefrom, wherein the improvement comprises:
   a brushless DC motor, an output shaft of which is coupled to the wiper assembly so that rotation of the output shaft in a first or a second direction rotates the blade in corresponding first and second directions between the extreme locations;
   means for periodically changing the direction of rotation of the motor and of the output shaft when the blade reaches an extreme location;
   means responsive to the blade reaching each of the extreme locations and an intermediate location between the extreme locations for:
   (i) accelerating the rotary motion of the blade in the first direction immediately after such motion changes from the second to the first direction;
   (iii) accelerating the rotary motion of the blade in the second direction immediately after such motion changes from the first to the second direction; and
   (iii) decelerating the rotary motion of the blade in the first or the second direction as and after it reaches a preselected intermediate location between the extreme locations; and
   the accelerating and decelerating means including:
   first sensor means for detecting the rotary position of the blade and for producing first signals indicating that the blade is in one of its extreme locations,
   second sensor means for detecting the rotary position of the blade and for producing a second signal indicating that the blade has reached the intermediate location between the extreme locations; and
   means responsive to the first and second signals for altering the commutation of the brushless DC motor to accelerate the blade after it reaches said one of the extreme locations and to decelerate the blade as and after it reaches the intermediate location.

2. A wiper assembly as set forth in claim 1 wherein said means for accelerating in the first and second directions and for decelerating includes means for accelerating and decelerating substantially continuously between each said extreme location and said intermediate location.

3. A wiper assembly as in claim 1, including pair of said assemblies and which further comprises:
   means for synchronizing the rotary speed and position of the output shaft of each said pair of assemblies and, consequently, of each blade.

4. A wiper assembly as in claim 3, wherein: the synchronizing means includes:
   means for generating first signals representative of the position of one blade;
   means for generating second signals representative of the position of the other blade;
   a first comparator for comparing the first and second signals and, as a result of the comparison, for causing the rotary speed of the output shaft of one assembly to approach the rotary speed of the output shaft of the other assembly; and
   a second comparator for comparing the second and first signals and, as a result of the comparison, for causing the rotary speed of the other output shaft to approach the rotary speed of the one output shaft.

5. A wiper assembly as in claim 1, wherein:
   the wiper assembly further comprises a reduction gearing means coupled between the brushless DC motor and the output shaft for rotating the output shaft sufficiently so as to rotate the blade once clockwise and then once counterclockwise between its extreme locations at the same time the motor rotates a multiplicity of times.

6. A wiper assembly as in claim 1, which further comprises:
   means for selectively adjusting the rotary speed of the output shaft and its blade.

7. A wiper assembly as in claim 1, wherein:
   the first sensor means include:
   sensors for detecting the rotary position of the blade and for producing the first signals indicating that the blades are their extreme locations; and
   the means for periodically changing include:
   logical electrical means responsive to the first signals from the sensors for altering the commutation of the brushless DC motor when the blade is at each of its extreme locations.

8. A wiper assembly as in claim 7, wherein:
   the logical electrical means includes
   switch means for controlling the commutation of the motor,
   means responsive to a first logical signal for operating the switch means to control the commutation of the motor for rotation in a first direction and responsive to a second logical signal for operating the switch means to control the commutation of the motor for rotation in a second direction, and means responsive to the signals from the sensors for applying the first logical signal to the operating means when the blade is in one of the extreme locations, and for applying the second logical signal to the operating means when the blade is in the other extreme location.

9. A wiper assembly as in claim 8, wherein: the applying means is an S-R latch.

10. A wiper assembly as in claim 9, wherein: the S-R latch includes a pair of logical gates each of which has an input connected to one of the sensors, a first connection between another input of one gate and an output of the other gate, a second connection between another input of the other gate and an output of the one gate, and a third connection between one of the gate outputs and the operating means for applying the first and second logical signals on one of the gate outputs to the operating means.

11. A wiper assembly as in claim 9, wherein: one sensor is located at each of the extreme blade locations.

12. A wiper assembly for a pair of side-by-side windshields which comprises a pair of the assemblies as set forth in claim 11.

13. A wiper assembly as in claim 1, wherein: the altering means is an electrical logical means.

14. A wiper assembly as in claim 13, wherein: the altering means includes means for detecting the speed of the motor, means for comparing the motor speed to a standard and for generating an error signal as a result of the comparison, switch means for controlling the speed of the motor, means responsive to the error signal for adjusting the motor speed to eliminate the error signal, means responsive to the first signals for altering the standard to produce an error signal which causes acceleration of motor speed, and means responsive to the second signal for altering the standard to produce an error signal which causes deceleration of motor speed.

15. A wiper assembly as in claim 14, wherein: the altering means includes an S-R latch which is SET when the blade is in either extreme location and which is RESET when the blade is in the intermediate location.

16. A wiper assembly as in claim 15, wherein:
the first sensor means includes a detector located at each extreme location, and
the second sensor means is located at the intermediate location.

17. A wiper assembly as in claim 16, wherein:
the S-R latch includes
first and second logical gates, one input of the first gate being connected to the second sensor,
a first connection between another input of the first gate and an output of the second gate, which in turn is connected to the standard,
a second connection between one input of the second gate and an output of the first gate, and
means for coupling another input of the second gate to the detector.

18. A wiper assembly as in claim 17, wherein:
the standard is the output of a voltage divider, such output being altered by the application to the voltage divider of signals on the output of the second gate.

19. An improved windshield wiper assembly of the type in which a wiper blade undergoes oscillatory rotary motion and is swept back and forth between two extreme locations across a windshield to remove rain and water therefrom, wherein the improvement comprises:

a pair of said wiper assemblies each comprising:
a motor, an output shaft of which is coupled to the wiper blade of that assembly so that rotation of the output shaft in a first or a second direction rotates the blade in first or second direction between the extreme locations;
means for periodically changing the direction of rotation of the motor and of the output shaft when the blade reaches an extreme location;
means responsive to the blade reaching each of the extreme locations for:
(i) accelerating the rotary motion of the blade in the first direction immediately after such motion changes from the second to the first direction;
(ii) accelerating the rotary motion of the blade in the second direction immediately after such motion changes from the first to the second direction; and
(iii) decelerating the rotary motion of the blade in the first or the second direction as and after it reaches a preselected intermediate location between the extreme locations; and
means for synchronizing the rotary speed and position of each output shaft of said pair of assemblies and, consequently, of each blade;
said synchronizing means including:
means for generating first signals representative of the position of one blade;
means for generating second signals representative of the position of the other blade;
a first comparator for comparing the first and second signals and, as a result of the comparison, for causing the rotary speed of the first output shaft to approach the rotary speed of the second output shaft; and
a second comparator for comparing the second and first signals and, as a result of the comparison, for causing the rotary speed of the second output shaft to approach the rotary speed of the first output shaft.

20. An improved windshield wiper assembly of the type in which a wiper blade undergoes oscillatory rotary motion and is swept back and forth between two extreme locations across a windshield to remove rain and water therefrom, wherein the improvement comprises:

a brushless DC motor, an output shaft of which is coupled to the wiper blade so that rotation of the output shaft in a first or a second direction rotates the blade in corresponding first or second directions between the extreme locations;
means for periodically changing the direction of rotation of the motor and of the output shaft when the blade reaches one of the extreme locations; and
means responsive to the blade reaching the extreme locations for:

(i) accelerating the rotary motion of the blade in the first direction immediately after such motion changes from the second to the first direction;

(ii) accelerating the rotary motion of the blade in the second direction immediately after such motion changes from the first to the second direction; and (iii) decelerating the rotary motion of the blade in the first or the second direction as and after it reaches a preselected intermediate location between the extreme location;

the means for periodically changing including:

sensors for detecting the rotary position of the blade and for producing signals indicating that the blades are in their extreme locations; and logical electrical means responsive to the signals for altering the commutation of the brushless DC motor when the blade is at one of its extreme locations;

said logical electrical means including:

switch means for controlling the commutation of the motor, means responsive to a first logical signal for operating the switch means to control the commutation of the motor for rotation in a first direction and responsive to a second logical signal for operating the switch means to control the commutation of the motor for rotation in a second direction, and means including an S-R latch responsive to the signals from the sensors for applying the first logical signal to the operating means when the blade is in one of the extreme locations, and for applying the second logical signal to the operating means when the blade is in the other extreme location.

* * * * *